(12) United States Patent
Asmussen et al.

(10) Patent No.: US 8,946,979 B2
(45) Date of Patent: Feb. 3, 2015

(54) HIGH-PRESSURE DISCHARGE LAMP

(75) Inventors: Knut Asmussen, München (DE);
Karsten Pietsch, Berlin (DE); Matthias Protsch, Berlin (DE)

(73) Assignee: OSRAM GmbH, Munich (DE)

( * ) Notice: Subject to any disclaimer, the term of this patent is extended or adjusted under 35 U.S.C. 154(b) by 274 days.

(21) Appl. No.: 13/509,554

(22) PCT Filed: Nov. 2, 2010

(86) PCT No.: PCT/EP2010/066651
§ 371 (c)(1),
(2), (4) Date: Jun. 21, 2012

(87) PCT Pub. No.: WO2011/057921
PCT Pub. Date: May 19, 2011

(65) Prior Publication Data
US 2012/0256545 A1  Oct. 11, 2012

(30) Foreign Application Priority Data

Nov. 11, 2009  (DE) .......................... 10 2009 052 704
Nov. 24, 2009  (DE) .......................... 10 2009 054 376

(51) Int. Cl.
*H01J 5/48* (2006.01)
*F21S 8/10* (2006.01)
*H01J 5/54* (2006.01)
*H01J 61/56* (2006.01)
*H05B 41/04* (2006.01)

(52) U.S. Cl.
CPC .............. *F21S 48/1109* (2013.01); *H01J 5/54* (2013.01); *H01J 61/56* (2013.01); *H05B 41/042* (2013.01); *Y02B 20/19* (2013.01)
USPC .............. 313/318.01; 313/318.12; 313/318.1; 313/318.09

(58) Field of Classification Search
CPC ................................... H01J 61/54; H01J 61/56
USPC ................ 313/318.01, 318.12, 318.1, 318.09
See application file for complete search history.

(56) References Cited

U.S. PATENT DOCUMENTS

| 6,731,076 | B1 | 5/2004 | Gerhard et al. |
| 7,042,169 | B2 | 5/2006 | Neumeier et al. |
| 2006/0227254 | A1 | 10/2006 | Kato et al. |
| 2007/0064437 | A1 | 3/2007 | Blumel et al. |
| 2008/0157696 | A1 | 7/2008 | Pokharna et al. |

FOREIGN PATENT DOCUMENTS

| DE | 199 13 942 | 4/2000 |
| DE | 10 2006 000 169 | 10/2006 |
| EP | 1 352 547 | 2/2005 |
| JP | 07-042169 | 2/1995 |
| JP | 10-003816 | 1/1998 |
| JP | 2002-541619 | 12/2002 |

*Primary Examiner* — Vip Patel
(74) *Attorney, Agent, or Firm* — Cozen O'Connor

(57) ABSTRACT

A high-pressure discharge lamp comprising a lamp base (3), a discharge vessel, and components of an ignition device for igniting the gas discharge in the discharge vessel of the high-pressure discharge lamp (1), wherein the lamp base (3) comprises an interior in which the components of the ignition device are disposed, wherein at least the high-voltage components (500, 510, 520) of the ignition device form an assembly (5) disposed in the interior of the lamp base and having a dedicated housing (50).

11 Claims, 4 Drawing Sheets

HIGH-PRESSURE DISCHARGE LAMP

RELATED APPLICATIONS

This application is a U.S. National Phase Application under 35 USC 371 of International Application PCT/EP2010/066651 filed Nov. 2, 2010.

This application claims the priority of German application no. 10 2009 052 704.4 filed Nov. 11, 2009 and 10 2009 054 376.7 filed Nov. 24, 2009, the entire content of both of which are hereby incorporated by reference.

FIELD OF THE INVENTION

The invention relates to a high-pressure discharge lamp having a simplified modular structure.

BACKGROUND OF THE INVENTION

Such a high-pressure discharge lamp is for example disclosed in EP 0 975 007 A1. This document describes a high-pressure discharge lamp having a lamp base, a discharge vessel, and components of an ignition device for igniting the gas discharge in the discharge vessel as well as components of an operational device to operate the high-pressure discharge lamp after ignition of the gas discharge, wherein the aforementioned components of the ignition and operational device are housed in the interior of the lamp base.

SUMMARY OF THE INVENTION

One object of the invention is to provide a generic high-pressure discharge lamp with a simplified modular structure and improved electrical insulation of the ignition device.

The high-pressure discharge lamp according to one aspect of the invention has a lamp base, a discharge vessel, and components of an ignition device for igniting the gas discharge in the discharge vessel of the high-pressure discharge lamp, wherein the lamp base possesses an interior in which the components of the ignition device are disposed. According to an embodiment of the invention at least the high-voltage components of the ignition device are combined to form a separate assembly with dedicated housing, disposed in the interior of the lamp base. As a result, at least the high-voltage components of the ignition device can be prefabricated, tested and assembled in the lamp base as an independent part. On account of having its own housing, this assembly also has improved electrical insulation compared to the other electrical components disposed in the interior of the lamp base.

The ignition device comprises, for example, an impulse ignition device, having an ignition transformer, an ignition condenser and a spark gap or a similar threshold switch as essential components. During the ignition phase of the high-pressure discharge lamp, the ignition condenser is charged up to the breakdown voltage of the spark gap or the threshold switch. On reaching the breakdown voltage, the ignition condenser discharges via the spark gap or the threshold switch and the primary winding of the ignition transformer. As a result, high-voltage pulses are generated in the secondary winding of the ignition transformer which result in the ignition of the gas discharge in the discharge chamber. In the case of a pulse ignition device, the ignition device, in the form of an assembly, of the high-pressure discharge lamp according to the invention comprises at least the aforementioned essential parts, which conduct high voltage during the ignition phase of the high-pressure discharge lamp. In addition, additional parts in the lamp base conducting high voltage during operation, such as for example one or more interference suppression chokes, can be provided, which can also be designed as an assembly with the high-voltage components of the ignition device of the high-pressure discharge lamp according to the invention.

Advantageously the assembly is disposed on an assembly board in order to ensure the flattest possible design of the ignition device and the lamp base. In addition to the assembly, components of an operational device for the high-pressure discharge lamp can be disposed on the same assembly board.

The ignition device of the high-pressure discharge lamp according to an embodiment of the invention contains an ignition transformer with at least one primary winding and at least one secondary winding as well as a high-voltage terminal connected to the at least one secondary winding, wherein the high-voltage terminal has a section connected to a power supply projecting from the discharge vessel which is separated by at least one wall or a wall section from the components of the ignition device and the components of the operational device. With the aid of the ignition transformer, during the ignition phase of the high-pressure discharge lamp the ignition voltage to ignite the gas discharge in the discharge vessel of the high-pressure discharge lamp is generated and by means of the high-voltage terminal this ignition voltage is supplied to a power supply and an electrode connected thereto of the high-pressure discharge lamp.

The section of the high-power voltage terminal connected to the power supply is preferably designed as a clamp contact or displacement contact, in order to ensure a simple and reliable electrically conductive connection between the power supply and the high-voltage terminal, which can be achieved without a connecting welding or soldering process. As a result the lamp base does not require any openings via which the connection point from the power supply and high-voltage terminal is accessible for welding or soldering tools. For the same reason the high-voltage terminal preferably comprises a rigid metal sheet or metal plate, one end of which is connected to the secondary winding of the ignition transformer and the other end of which is equipped with the aforementioned displacement or clamp contact to enable a reliable connection to the power supply protruding from the near-socket end of the discharge vessel.

The spark gap and the ignition condenser are electrically connected advantageously to contact pins which are preferably also designed as insulation displacement connectors or as clamp contacts. The wired components are for example accommodated by V-shaped embodiments of the contact pins which can then, for example, also be welded, re-struck or soldered if necessary e.g. to increase the reliability of the connection. The contact pins are advantageously inserted into the housing of the ignition device or sheathed with plastic and form contact elements for electrical connection to the assembly board on the bottom of the ignition device. These contact elements are advantageously designed such that they can be contacted both by means of traditional Through Hole Technology (THT) and by means of press-fit technology.

The ignition transformer of the high-pressure discharge lamp according to the invention preferably has a ferrite core on which the at least one secondary winding is disposed in order to enable high permeability and a spatially compact arrangement of the ignition transformer. With a view to a compact spatial arrangement, the ferrite core is preferably designed as a rod-shaped core.

Advantageously the ignition transformer of the high-pressure discharge lamp according to an embodiment of the invention has a bobbin, made of electrically insulating material, surrounding the ferrite core, on which the at least one primary winding is disposed in order to ensure a spatially compact arrangement of the ignition transformer and a good inductive coupling between primary and secondary winding.

The bobbin preferably forms a frame which supports the ferrite core on two opposing sides and preferably has a flat, compact structure. In this way, a space-saving bracket for the ferrite core and the at least one secondary winding disposed thereupon can be simply ensured without great material costs. The frame-like bobbin can furthermore be used to fix the ends of primary and secondary windings and to fix the high-voltage terminal. In addition, it enables the embedding of the primary and secondary winding in electrically insulating sealing compound and consequently increases the high-voltage resistance of the ignition transformer.

The lamp base of the high-pressure discharge lamp according to an embodiment of the invention forms a second housing, having a bottom and a hood-like cover, in order to be able to house the assembly and additional electrical components of the ignition or operational device easily in the lamp base or in the second housing. According to the preferred exemplary embodiment of the invention, the assembly board equipped with the assembly and additional electrical components is disposed on the bottom of the second housing so that the hood-like cover covers the components disposed on the assembly board. Standard connection technologies such as, for example, rivets, flanging, hot caulking, welding, etc. can be used to connect the bottom and hood-like cover.

The hood-like cover is advantageously provided with a breakthrough for the discharge vessel or for power supplies protruding from the discharge vessel in order to be able to connect the power supplies for the light sources disposed in the discharge vessel to the ignition device and the components of the operational device.

In addition, a bracket for the discharge vessel or for an outer envelope surrounding the discharge vessel is preferably fastened to the hood-like cover. As a result, the electrical connections between the power supplies protruding from the discharge vessel and the ignition device or the components of the operational device are mechanically relieved of pressure. In particular, the weight of the discharge vessel is borne not by the aforementioned electrical connections but by the hood-like cover. The bracket for the discharge vessel or for the lamp vessel unit comprising a discharge vessel and outer envelope is preferably ring-shaped and disposed on the edge of the breakthrough in the hood-like cover.

The lamp base of the high-pressure discharge lamp according to an embodiment of the invention is provided with a means of electromagnetic shielding of the components of the ignition device and of the operational device disposed in its interior in order to prevent interference from high-frequency signals which are generated by the ignition device or operational device during operation of the lamp. For example, the lamp base is for this purpose coated with metal on its interior or exterior or the hood-like cover and the bottom are made entirely of metal or electrically conductive plastic or of plastic with a metal coating.

The high-pressure discharge lamp according to an embodiment of the invention is provided with means for electromagnetic shielding of the light sources disposed in the interior of the discharge vessel in order to prevent interference from high-frequency signals which may be emitted by the light sources during operation of the lamp, in particular during operation of the high-pressure discharge lamp with currents in the megahertz or gigahertz range. For example, the discharge vessel or an outer envelope surrounding the discharge vessel is provided with a translucent, electrically-conductive coating for this purpose. A coating of indium tin oxide (a so-called ITO layer) is suitable for this purpose.

BRIEF DESCRIPTION OF THE DRAWINGS

The invention is described below in more detail on the basis of a preferred exemplary embodiment. The figures show.

DETAILED DESCRIPTION OF THE DRAWINGS

Figure 1:
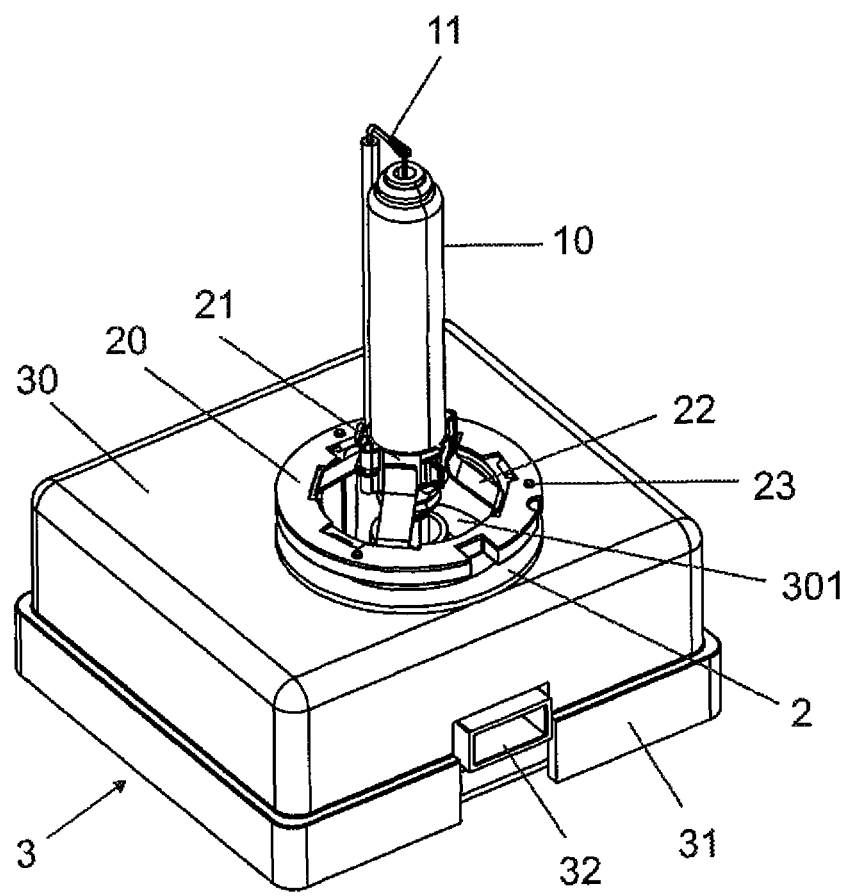
FIG. 1 A plan view of the high-pressure discharge lamp according to the preferred exemplary embodiment FIG. 2 A description of the components of the high-pressure discharge lamp shown in FIG. 1 without the base housing FIG. 3 A plan view of the assembly board disposed in the lamp base with the attached electrical components of the operational device and the ignition device FIG. 4 A plan view of the ignition transformer depicted in FIG. 3

FIG. 1 is a diagram of a high-pressure discharge lamp according to the preferred exemplary embodiment of the invention. This high-pressure discharge lamp is a halogen metal vapor high-pressure discharge lamp 1 with a nominal power draw of 25 watts, which is provided as a light source for a motor-vehicle headlamp.

This high-pressure discharge lamp 1 has a lamp vessel component 10, which consists of a discharge vessel and an outer envelope surrounding the discharge vessel. Two gas discharge electrodes and a filling are disposed in the interior of the discharge vessel to generate a gas discharge. The filling is mercury-free and consists of halides, preferably iodides, the metals sodium, scandium, indium and zinc and also contains xenon with a filling pressure ranging between 1.3 megapascals and 1.8 megapascals. The aforementioned filling pressure values relate to a temperature of 22° C.

The lamp vessel component 10 is fixed to the hood-like upper part 30 of the lamp base 3 by means of a ring-type plastic holder 2, a metal sleeve 21 and four metal welding straps 22 as well as a metal washer 20. The metal sleeve 21 surrounds the outer envelope of the lamp vessel component 10 in a clamping position. One end of each of the four welding straps 22 is welded to the metal sleeve 21. The other end of each of the welding straps 22 is welded to the metal washer 20, which is fixed to the upper side of the ring-type holder 2 and covers it. The ring axis of the holder 2 is disposed coaxially to the axis of the essentially cylindrical lamp vessel component 10. The plane defined by the metal washer 20 serves as a reference plane for aligning the lamp vessels in the reflector of the motor-vehicle headlamp. The ring-type holder 2 and the metal washer 20 are, for example, connected by means of screws 23 to the hood-like upper part 30 of the base 3. The hood-like upper part 30 of the lamp base 3 has a breakthrough 301, through which the end of the lamp vessel component 10 at the base end and a return current conductor 11 protruding from the end of the lamp vessel component 10 furthest from the lamp base and returned to the lamp base 3 protrude into the interior of the lamp base 3. The end of the return current conductor 11 protruding into the interior of the base is connected to an electric contact on an assembly board 4, on which electrical components of an ignition and/or operational device of the high-pressure discharge lamp are disposed. The hood-like upper part 30 together with the bottom section 31 forms the essentially cuboid lamp base 3 of the high-pressure discharge lamp 1, in the interior of which an ignition device for igniting the gas discharge in the high-pressure discharge lamp 1 and the components 6 of an operational device for operating the high-pressure discharge lamp 1 after ignition of the gas discharge are disposed. The side wall of the hood-like upper part 30 has a recess 303 for a plug 32, which forms the electrical connection of the high-pressure discharge lamp 1. An assembly board 4 is disposed and fastened to the bottom part 31 of the lamp base 3, and is equipped with the ignition device 5 and the components 6 of the operational device for the high-pressure discharge lamp 1.

Figure 2:
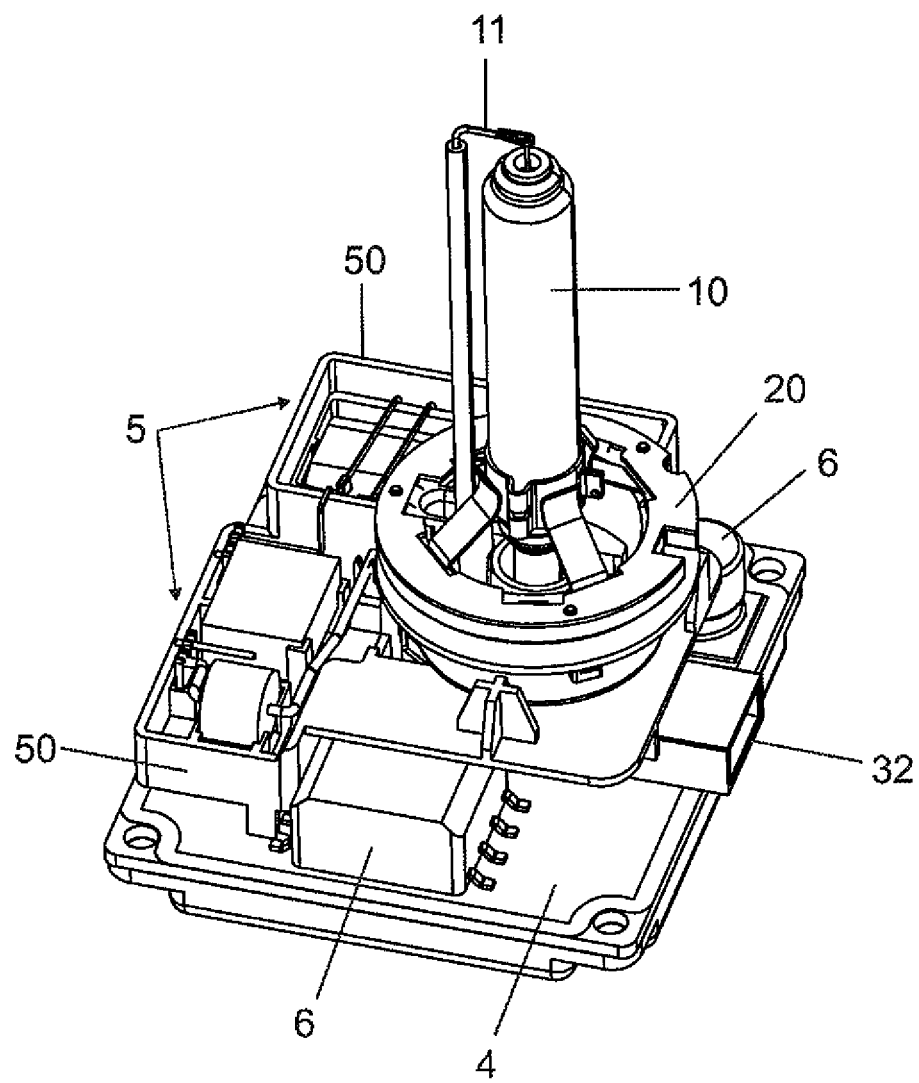
Figure 3:
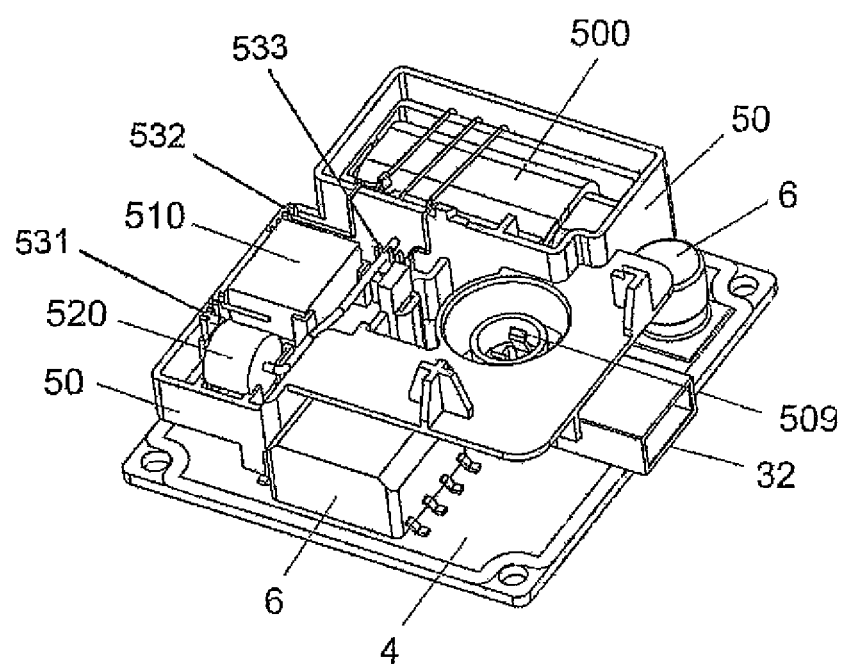

The assembly board 4 with the components 6 of the operational device and of the ignition device 5 fixed to it is depicted in FIGS. 2 and 3. The ignition device 5 is an impulse ignition device, the high-voltage conducting components of which are designed as a prefabricated assembly 5 and are disposed in their own housing 50. The impulse ignition device comprises an ignition transformer 500, an ignition condenser 510 and a threshold value such as, for example, a spark gap 520 and contact pins 531, 532, 533 for contacting the components of the ignition device with contacts on the assembly board. If necessary, a charging resistor is also housed in the ignition device. The assembly 5 consists of the ignition transformer 500, the ignition condenser 510 and the spark gap 520 as well as the housing 50. The contact pins 531, 532, 533 each produce the connection between the wired components 500 to 520 and the assembly board 4. On one side the contact pins 531, 532, 533 with a V-shaped contour receive the wire ends of the aforementioned components and on the other side they produce the electrical contact with the assembly board 4. The connection between the contact pins 531, 532, 533 and the assembly board 4 can be produced using traditional connection technology such as, for example, soldering or press-fitting.

The aforementioned charging resistor is not a component of the assembly, but is disposed outside the housing 50. The housing 50 is open on one side to enable the filling of an electrically insulating sealing compound. The impulse ignition device 5 constitutes an independent module which is mounted on the assembly board 4 as a single component. The free end 509 of the high-voltage terminal 501 of the secondary winding of the ignition transformer 500 is surrounded by a ring-shaped wall section of the housing 50. The components 6 of the operational device form a boost converter and a full-bridge inverter fed by the boost converter, in the bridge arm of which full-bridge converter the discharge gap of the high-pressure discharge lamp 1 is connected. By means of the boost converter and the full-bridge inverter, a low-frequency alternating voltage is generated from the system voltage of the vehicle to operate the high-pressure discharge lamp.

Figure 4:
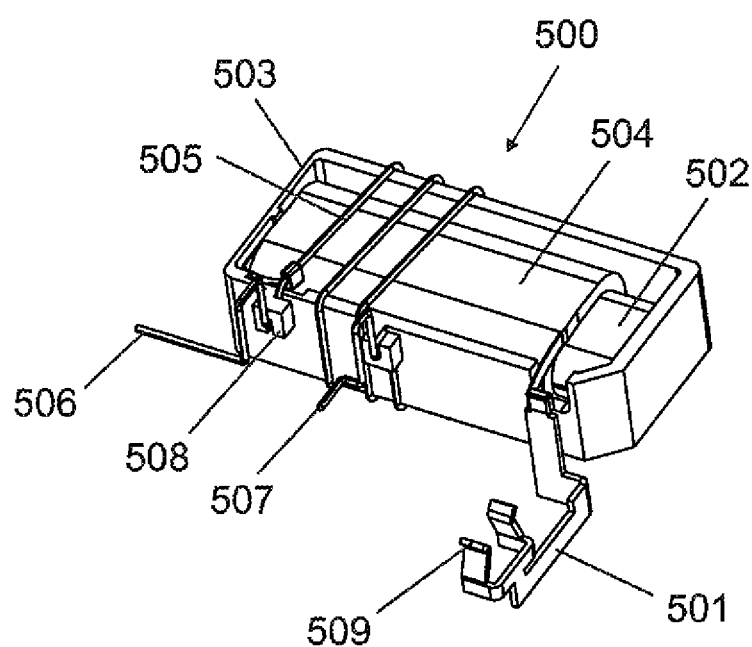

FIG. 4 shows details of the ignition transformer 500. The ignition transformer 500 has a rod-like ferrite core 502, which is surrounded by an essentially square plastic frame 503 so that the end faces of the ferrite core 502 are disposed to fit tightly between two opposing short sides of the plastic frame 503. The rod-like ferrite core 502 has an oval cross-section. The secondary winding 504 of the ignition transformer 500 is wound directly onto the ferrite core 502 such that the plastic frame 503 frames the ferrite core 502 and the secondary winding 504 wound around it. The primary winding 505 of the ignition transformer 500 is wound onto the plastic frame 503 so that it lies on the external surface of the long sides of the square plastic frame 503 and spans the ferrite core 502 with the secondary winding 504 disposed thereon. The windings of the secondary winding 504 and primary winding 505 are electrically insulated from each other. The ignition transformer 500 has three electrical terminals 501, 506 and 507. The terminal 501 is designed as a high-voltage terminal on which the high voltage for igniting the gas discharge in the high-pressure discharge lamp is provided during the ignition phase. The terminal 501 is electrically conductively connected to a first end of the secondary winding 504. The terminals 506 and 507 are the ends of the primary winding 505 and serve to supply voltage to the ignition transformer 500. The terminal 506 is furthermore electrically conductively connected to the second end of the secondary winding 504. The ends 506, 507 of the primary winding are routed in guide rails 508, which are molded on a long side of the plastic frame 503 on its outer side, and protrude over the guide rails 50B. The terminal 501 is formed by a sheet metal part which is connected to the first end of the secondary winding 504 by means of a welding process, a soldering process or a similar process technology. The free end 509 of the terminal 501 is designed as a contact terminal which clamps the end of a current supply (not shown) protruding from the base-side end of the lamp vessel unit 10 so that an electrically conductive connection is ensured between the free end 509 and the aforementioned current supply.

The invention is not limited to the aforementioned exemplary embodiment described in greater detail. For example, the assembly 5 may include the complete ignition device, including charging resistor for the ignition condenser, as well as additional components conducting high voltage, such as interference suppression chokes, for example.

The invention claimed is:

1. A high-pressure discharge lamp comprising a lamp base, a discharge vessel, and components of an ignition device configured to ignite the gas discharge in the discharge vessel of the high-pressure discharge lamp, wherein the lamp base comprises an interior in which the components of the ignition device are disposed, the components of said ignition device comprising high-voltage components,
wherein
at least the high-voltage components of the ignition device form an assembly disposed in the interior of the lamp base and having a dedicated housing,
said assembly is disposed on an assembly board,
the lamp base forms a second housing having a bottom and a hood-like cover, and
said assembly board is disposed on the bottom of the second housing and the hood-like cover covers the components of the ignition device disposed on the assembly board as well as the assembly itself.

2. The high-pressure discharge lamp as claimed in claim 1, wherein the high-voltage components of the ignition device comprise an ignition transformer, an ignition condenser and a spark gap or a similar threshold element.

3. The high-pressure discharge lamp as claimed in claim 2, wherein the ignition transformer has at least one primary winding and at least one secondary winding as well as a high-voltage terminal connected to the at least one secondary winding, and wherein the high-voltage terminal has a section connected to a power supply protruding from the discharge vessel.

4. The high-pressure discharge lamp as claimed in claim 3, wherein the section of the high-voltage terminal connected to a power supply protruding from the discharge vessel comprises a clamp contact or displacement contact.

5. The high-pressure discharge lamp as claimed in claim 3, wherein the ignition transformer has a ferrite core, on which the at least one secondary winding is disposed.

6. The high-pressure discharge lamp as claimed in claim 5, wherein the ferrite core comprises a rod-shaped core.

7. The high-pressure discharge lamp as claimed in claim 5, wherein the ignition transformer has a bobbin made of electrically insulating material surrounding the ferrite core, on which the at least one primary winding is disposed.

8. The high-pressure discharge lamp as claimed in claim 7, wherein the bobbin comprises a frame which supports the ferrite core on two opposing sides.

9. The high-pressure discharge lamp as claimed in claim 1, wherein the hood-like cover has a breakthrough for the discharge vessel or for a power supply protruding from the discharge vessel.

10. The high-pressure discharge lamp as claimed in claim 1, wherein the lamp base has structure that electromagnetically shields the components of the ignition device of the operational device disposed in its interior.

11. The high-pressure discharge lamp as claimed in claim 1, wherein the high-pressure discharge lamp has structure that electromagnetically shields the light sources disposed in the interior of the discharge vessel.

\* \* \* \* \*